Figure 1:
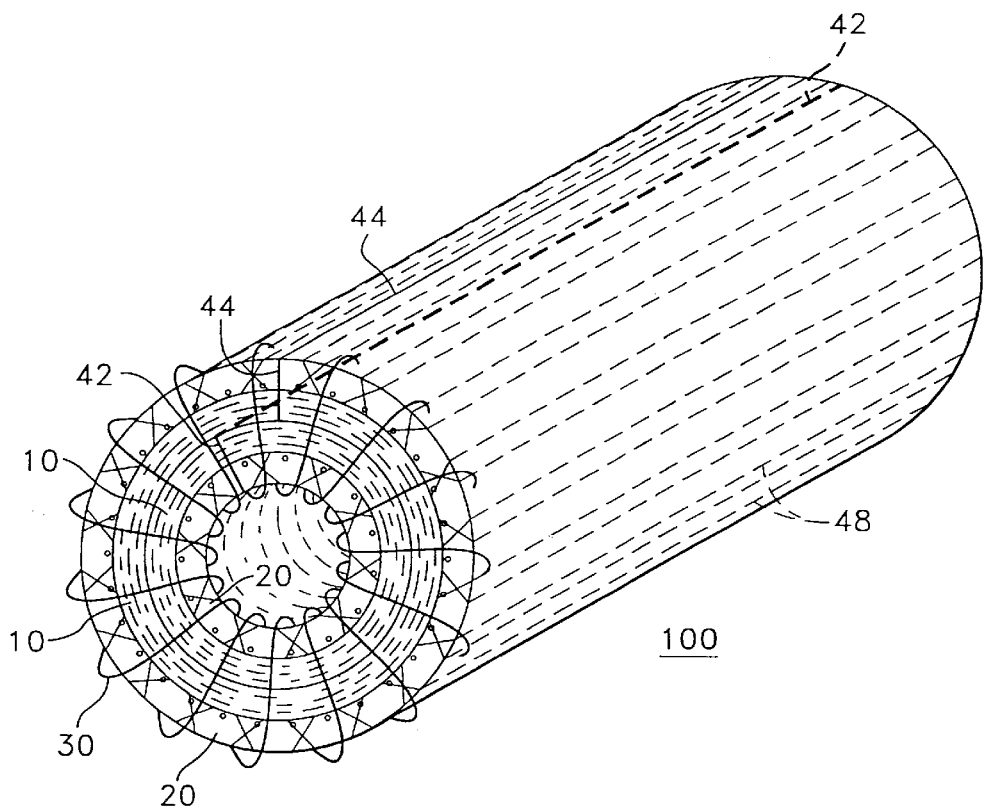

United States Patent [19]
Kittson et al.

[11] Patent Number: 5,911,246
[45] Date of Patent: Jun. 15, 1999

[54] PRESSURE-EXPANDABLE CONDUIT LINER

[75] Inventors: Mark Kittson, Niagara Falls; Steve Kulawic, Jordan Station, both of Canada

[73] Assignee: Bay Mills, Ltd., Weston, Canada

[21] Appl. No.: 09/010,744

[22] Filed: Jan. 22, 1998

Related U.S. Application Data

[62] Division of application No. 08/548,375, Oct. 26, 1995, Pat. No. 5,836,357.

[51] Int. Cl.$^6$ .................... F16L 55/18; F16L 9/14
[52] U.S. Cl. .................... 138/98; 138/141; 138/128; 138/174; 138/124; 428/36.2
[58] Field of Search .................... 138/98, 97, 140, 138/141, 156, 170, 123–125, 174, 128; 156/156, 287, 294; 264/516, 269, 36; 428/36.2

[56] References Cited

U.S. PATENT DOCUMENTS

| | | | |
|---|---|---|---|
| 1,722,764 | 7/1929 | Rasch | 138/98 X |
| 3,996,967 | 12/1976 | Takada | 138/97 |
| 4,009,063 | 2/1977 | Wood | 138/97 X |
| 4,227,957 | 10/1980 | Keuchel et al. | 156/443 |
| 4,283,457 | 8/1981 | Kolsky et al. | 156/148 X |
| 4,390,574 | 6/1983 | Wood | 428/36.2 |
| 4,768,562 | 9/1988 | Strand | 138/98 |
| 4,851,274 | 7/1989 | D'Elia | 428/113 |
| 4,976,290 | 12/1990 | Gelin et al. | 138/141 |
| 5,285,741 | 2/1994 | Askin | 112/262.2 |
| 5,334,429 | 8/1994 | Imoto et al. | 428/36.2 |
| 5,451,351 | 9/1995 | Blackmore | 138/97 X |

FOREIGN PATENT DOCUMENTS

| | | |
|---|---|---|
| 403133 | 6/1990 | European Pat. Off. |
| 3339305 | 8/1987 | Germany |
| 3716476 | 12/1987 | Germany |
| 3819657 | 7/1989 | Germany |
| 3305348 | 1/1990 | Germany |
| 4103980 | 8/1992 | Germany |

*Primary Examiner*—Patrick F. Brinson
*Attorney, Agent, or Firm*—Duane, Morris & Heckscher; Peter J. Cronk

[57] ABSTRACT

Conduit liners and methods for their construction and use are provided. The liners include a first flexible layer mechanically bonded to at least one glass-containing layer and folded to form a tubular laminate. The laminate can be penetrable by resinous liquid capable of setting the form of substantially continuous matrix within the laminate following the expansion of the laminate within a conduit. In preferred versions of the liner, multiple glass layers are provided on the inner and outer diameter of the construction with a polyester core so as to meet minimum thickness requirements for vibration resistance under American in situ pipe vibration resistance codes.

5 Claims, 2 Drawing Sheets

PRESSURE-EXPANDABLE CONDUIT LINER

RELATED APPLICATION DATA

This application is a division of U.S. patent application Ser. No. 08/548,375, filed Oct. 26, 1995, now U.S. Pat. No. 5,836,357.

FIELD OF THE INVENTION

This invention relates to conduit liners for making repairs in underground piping systems, and more particularly to laminated liner configurations that provide improved strength and handling for such repairs.

BACKGROUND OF THE INVENTION

Underground piping systems are essential in providing the transportation of liquids and gases to homes and businesses. Used mostly by utilities in sewer pipes, water pipes, water mains, gas mains, and other applications, such pipes are often found many feet underground or in inaccessible areas, such as under buildings or roadways.

Due to cyclical loadings, premature wear, manufacturing defects, corrosion, and other factors, these pipes can often develop ruptured or weakened areas requiring repair. Although the surest way to repair such leaks is to replace the damaged section, replacement is often difficult and expensive.

Recently, in situ pipe repair procedures have been developed which include the insertion of a pliable polyester felt sleeve impregnated with a thermosetting resin. The sleeve is inserted coaxially through the damaged pipe portion and pressurized so that the resin-impregnated sleeve presses firmly against the inner wall of the damaged pipe. The expanded liner is then permitted to cure to form a new lining within the original pipe.

In Europe, where fiberglass liners have been developed, higher strengths have been provided without the use of polyester, by simply impregnating glass fiber laminates with synthetic resin.

Glass fiber mats are attractive replacements for polyester tubing material for making pipe repairs since they can achieve the same mechanical properties with less than half the wall thickness of comparable polyester liners. Unfortunately, since only polyester tubing has been contemplated, many United States pipe repair specifications call for a minimum liner thickness requirement for different circumstances. These thicknesses vary between 6 and 18 mils. Manufacturing an all glass liner within these tolerances would be wasteful, not to mention costly, since only about two mills of glass fabric is necessary to provide sufficient tensile strength for an underground pipe repair.

There appears to be some recognition of a weakness along the longitudinal seams of current conduit liners made from either polyester or glass fiber. Since most of these liners are made from folded mats which are joined with a longitudinal butt-seam for bonding the opposite lateral edges of the mat, a discontinuity in the liner's sidewall is created which is significantly weaker than the remaining cross-section at any other point along the circumference of the liner. This discontinuity presents a threat of delamination or separation during insertion and pressurized expansion of the liner inside a pipe.

Efforts to overcome this weakness in the wall structure have included laminating or sewing a polyester patch to the seam of polyester liners. Although this effort to reinforce an apparent weakness in the side wall has been somewhat successful, it results in a distortion of the smooth circumference of the liner, making it rather difficult to match the inner diameter of the pipe to be repaired. This technique has also not been very successful with glass liners since the irregular texture of the fiberglass resists efforts to create a sound joint. Accordingly, fiberglass liners are usually butt-joined together by a longitudinal stitch or line of adhesive, leaving a weak site through the entire cross-section of the liner.

SUMMARY OF THE INVENTION

The present invention provides pressure-expandable conduit liners which include, in a first embodiment, a first flexible fabric layer mechanically bonded to a glass-containing layer and folded to form a smooth tubular laminate. This laminate is penetrable by a resinous liquid capable of setting to form a substantially continuous matrix within the pores of the tubular laminate following expansion within a conduit to be repaired.

Accordingly, this invention fully meets American liner thickness standards for vibration resistance without wasting expensive glass fiber material, and simultaneously provides a stronger liner than that which could be achieved with polyester fabric alone. The laminated conduit liners of this invention include strong mechanical bonds and provide composite-like reinforcement when combined with thermoplastic or thermosetting resins. Combining these materials is no minor task, since any bonding procedure used to join the fabric- and glass-containing layers together must maintain the porous nature of the liner, yet must have a strong enough bond to resist delamination during installation and expansion of the liner.

In further embodiments of this invention, conduit liners are provided which include a flexible polyester-containing layer and a pair of overlapping glass-containing layers of chopped glass fibers. The polyester-containing and glass-containing layers are sewn together with a thread to produce a tubular laminate sandwich having first and second non-overlapping longitudinal seam portions. This laminate also includes a resinous liquid which preferably penetrates through the polyester-containing and glass-containing layers to form a continuous solid matrix following expansion of the laminate within a damaged conduit. This particular embodiment provides non-overlapping longitudinal seam portions so as to avoid through-thickness radial discontinuities in the liner. This feature not only provides a stronger liner during pressure expansion, but also helps to keep a uniform outer diameter for the liner for more closely matching the interior diameter of a pipe or conduit. The resulting tubular laminate can have a six or eight mil minimum thickness with a tensile strength of at least about 7,000–9,000 psi.

In still another embodiment of this invention, a glass liner is provided with a lap joint. This liner is also reinforced with a resinous liquid.

A BRIEF DESCRIPTION OF THE DRAWINGS

Figure 2:
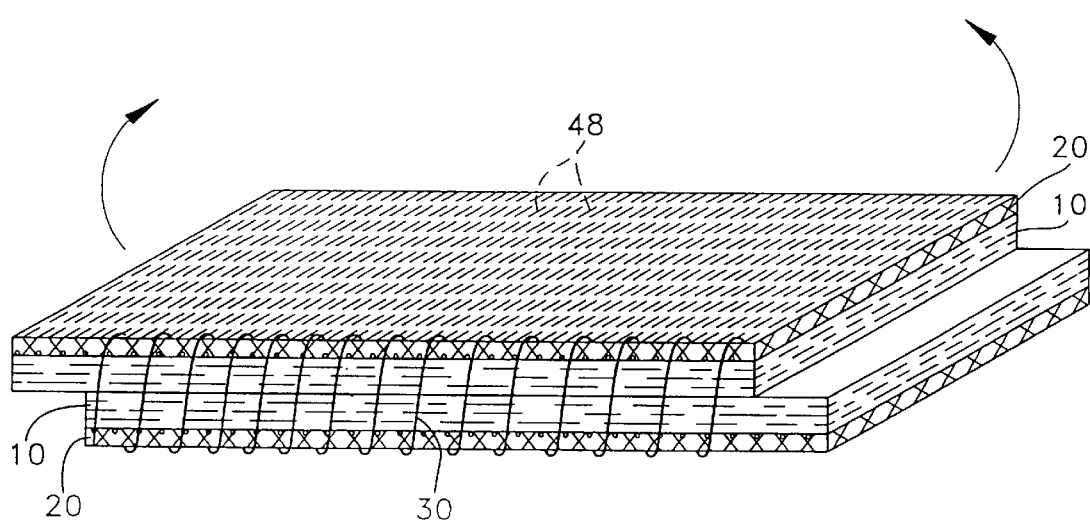
Figure 3:
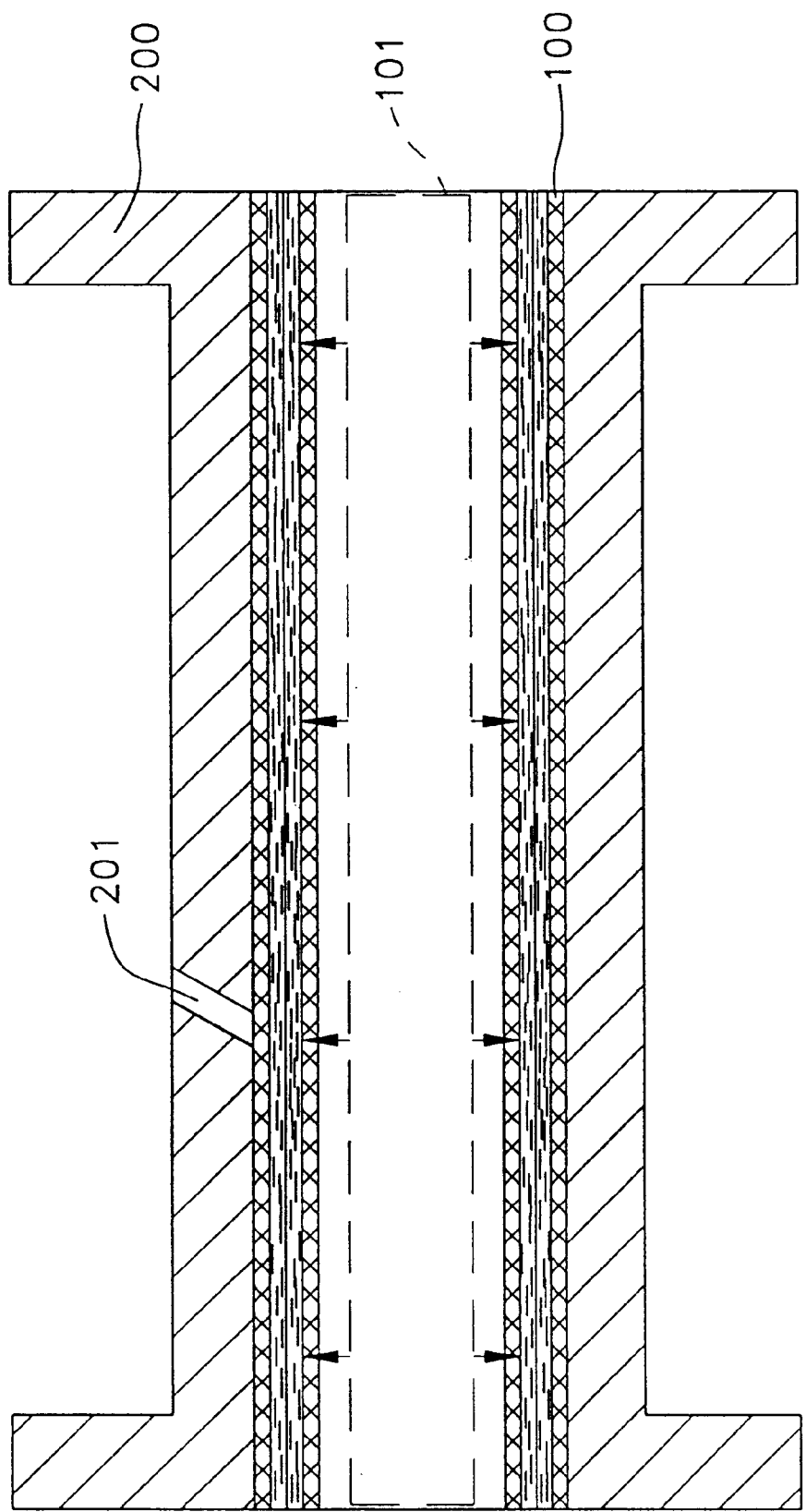

The accompanying drawings illustrate preferred embodiments of the invention according to the practical application of the principles thereof and in which:

FIG. 1: is a front perspective view of the conduit liner of this invention;

FIG. 2: is a side-plan view of a stitched laminated precursor of the conduit liner of FIG. 1;

FIG. 3: is a cross-sectional side view of a damaged pipe being repaired with the preferred conduit liner of FIG. 1.

A DETAILED DESCRIPTION OF THE INVENTION

Expandable conduit liners, methods of manufacturing these liners and methods of installing them within damaged conduits are provided by this invention. These liners provide high tensile modulus and strength but still meet the minimum thicknesses required to meet American vibration resistance standards. This can be achieved, as explained below, by mechanically bonding fabric and glass-containing layers together prior to impregnation with a resinous material.

With reference to the drawings, and particularly FIGS. 1 and 2 thereof, there is shown a preferred conduit liner 100 containing a fabric layer 10 mechanically bonded to a pair of glass-containing layers 20. This can be accomplished, for example, by stitch thread 30 woven to bond the fabric layer 10 and glass-containing layers 20 together. The resulting tubular laminated form, shown in FIG. 1, includes a pair of longitudinal seam portions, specifically an outer seam portion 44 and an inner seam portion 42 which are preferably not radially aligned so as to avoid a continuous radial discontinuity through the wall thickness of the conduit liner 100.

In the preferred conduit liner 100 of this invention, the glass-containing layers 20 represents the reinforcement layers and are preferably of a thinner cross-sectional thickness then the fabric layer 10. They can also be located radially outward and radially inward from the fabric-containing layer 10 so as to provide abrasion resistance and strength where they are most needed.

The preferred fabric layer 10, which can be two or more sewn or bonded fabric layers, comprises a natural or synthetic fibrous material in woven or nonwoven mat form. Suitable materials should be water and corrosion-resistant. Good examples include pulp fiber, cotton, polyethylene, polypropylene, and polyester fibers. In certain instances, woven or nonwoven glass material can be used, in addition to, or as a substitute for these other fibers. The most preferred embodiment is a needle-punched nonwoven polyester mat employing standard technology for manufacturing needle-punched materials. Thicknesses of about 3–6 mils would be suitable for this layer 10.

The glass-containing layers 20 of this invention preferably contains chopped glass fibers, such as E or ECR-type glass fibers. Such fibers can be blended with thermoplastic or thermosetting resinous fibers, although this is not necessary for performance. Alternatively, one hundred percent chopped glass fibers can be distributed over the fabric layer 10 and mechanically bonded thereto to produce the liner layers of the conduit liner 100. This can be accomplished using a stitch mat process in which the preferred needle-punched polyester mat is stitched to a plurality of chopped glass fibers on its top surface. This results in a fiber glass-coated-polyester substrate laminate. Preferably, unidirectional polymer or glass rovings can be provided in the machine direction or cross-machine direction or both directions to allow for the handling of the resulting laminate without significant stretching.

Because of the glass fiber reinforcement, the conduit liners of this invention have a tensile modulus of at least about 900,000 to 1,000,000 psi with a tensile strength of at least about 7,000–9,000 psi. This is a tremendous improvement over polyester conduit liners having a tensile strength of only about 3,000 psi. Desirably, the liners of this invention include an overall thickness falling within conventional American standards, for example, 6 mils. In these forms, this invention preferably uses at least 1–3 mils of glass with the balance being polyester material, although a full thickness glass liner could be used with some additional cost.

The resinous liquid of this invention can be any number of thermosetting or thermoplastic compositions which can be introduced into either the fabric- or glass-containing layers, or both, and thereafter set or hardened to provide a solid matrix. Suitable thermoplastic compositions include thermoplastic polyvinyl chloride, polyolefins, and the like. Suitable thermosetting resins can include those containing a heat activated curing agent, a curing agent, or a heat deactivated curing retarding agent. Such examples include vinyl ester, epoxy and thermosetting polyester.

With respect to FIG. 3, one procedure for inserting the preferred conduit liner 100 of this invention will now be described. This improved method is designed to repair a crack 201 in a ruptured underground conduit, such as pipes, mains or drains. Man holes, when not already present, can be provided on opposite sides of the ruptured pipe sections after the pipe 200 has been suitably emptied and the particular section is uncoupled from adjacent sections. The unexpanded conduit liner 101 is then inserted into the cleaned pipe 200 and clamped by end plates to the pipe end fringes. Hot pressured fluids, such as air or water, can be pumped into the liner until it expands. This pressure can remain within the liner until the thermosetting or thermoplastic resin impregnated therein sets or cures. The end plates can then be removed and the repaired section recoupled to the adjacent pipe sections. The linings of this invention may also be used with undamaged conduit before installation.

EXAMPLE

A polyester needle-punched carrier composed of approximately fifteen denier per filament polyester and having a basis weight of about 200–1000 gram/meter$^2$ square is provided from raw stock and introduced into a stitch mat processing line. Unidirectional rovings of 750 tex to 2,200 tex spaced at about 1–6 inches are then applied in the machine direction on top of the polyester needle-punched carrier. Additionally, chopped fiber glass fiber is applied to the top of the carrier layer. This fiber contains 2,400 tex chopped glass fibers dispersed at about 200 grams–1000 grams/meter$^2$. The roving and chopped glass fibers are stitched together with polyester stitch yarn. The rovings are placed substantially parallel to the length of the liner so that when the liner is pulled into a pipe the rovings carry the weight of the product to relieve stress and avoid stretching and tearing.

A pair of glass layered stitched mat polyester layers are then severed from the web and mechanically bonded, for example, by stitching, or needling, back to back so that the polyester fabric layers are facing one another. This stitching is also a polyester stitch yarn. These two layers are laterally offset from one another, so as to provide a step on either side of the laminated construction. This process results in a relatively flat sandwich having fiber glass outer surfaces and a polyester core.

Finally, the flat sandwich construction is processed through a folder which transforms it into a tubular form. The step areas produced by the second stitch mat step are positioned to overlap one another, and an adhesive is dispensed into this overlapping area so as to adhesively bond them together in "lap-joint" fashion. The adhesive preferably is a polyamide type. The adhesive should be chemically and thermally resistant to the thermosetting chemistries of the saturants; otherwise the seam may fail and may not attach properly.

Once the seams have been set, a thermosetting polyester saturant is used to impregnate the glass and polyester layers. Following saturation, the material is preferably cooled to prevent curing until installed within a conduit, which may take up to five days.

The thermosetting polyester saturant is exothermic during curing and may achieve temperatures in an excess of 300° F.

The product of this Example achieved excellent interlayer adhesion with the overlapping layers and stitch mat processing. The product had good handling characteristics for repair applications without damaging the polyester or glass layers due to the reinforcement of the unidirectional roving. Since there is no overlapping on the outer diameter of the liner such as with prior art examples, and there was not a through-thickness radial seam, which would otherwise provide a point of failure, the product possessed uniform properties around its circumference and could be easily expanded by internal fluid pressure without posing a significant risk of failure.

From the foregoing it can be realized that this invention provides improved conduit liners having a uniform circumference, high tensile modulus, high strength and sufficient thickness to meet vibration resistant codes in the United States. Although specific examples of liner laminates were described, it is understood that this invention could contain any number of glass-containing and fabric layers, in any order of layering so long as the overall thickness meets the usual guidelines for vibration thickness minimums. The liners of this invention are suitable for conduit repairs in sewers, water pipes, gas lines, and also in new piping constructions where a corrosion and wear resistant lining material is desirable. Although various embodiments have been illustrated, this is for the purpose of describing, but not limiting the invention. Various modifications, which will become apparent to one skilled in the art, are within the scope of this invention described in the attached claims.

What is claimed is:

1. A pressure-expandable conduit liner, comprising a flexible polyester-containing layer sandwiched between a pair of glass-containing layers comprising chopped glass fibers, said polyester-containing layer and glass-containing layers being mechanically bonded by needling or sewing said layers together to produce a laminate, said laminate folded and bonded into a tubular member comprising first and second non-overlapping longitudinal seam portions;

a resinous liquid impregnating said tubular liner member which is capable of setting to form a continuous matrix with said tubular liner member following expansion of said tubular liner member within a conduit.

2. The liner of claim 1 wherein said glass-containing layers comprise chopped-glass fibers distributed over said flexible polyester-containing layer.

3. The liner of claim 2 wherein said polyester-containing layer and said glass-containing layers are adhesively bonded to one another to form a interlocking tubular form having at least a pair of non-overlapping longitudinal seam portions.

4. The liner of claim 1 wherein said tubular liner member has a tensile strength of at least about 7,000–9,000 psi.

5. The liner of claim 1 wherein said first flexible polyester-containing layer and said glass-containing layers are joined along a pair of laterally located stepped portions.

* * * * *